July 21, 1959
M. A. STEINHACKER
2,896,142
SERVO CONTROLLER
Filed Dec. 12, 1956
2 Sheets-Sheet 1
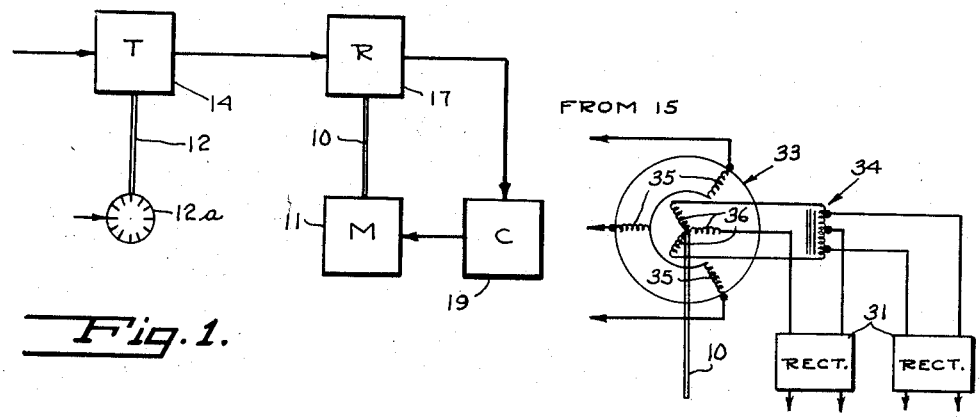
Fig.1.
Fig.4.
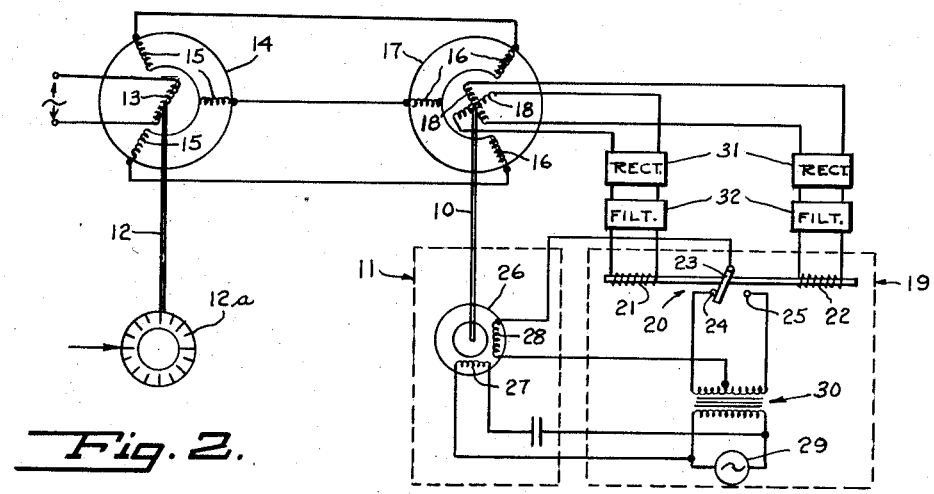
Fig.2.
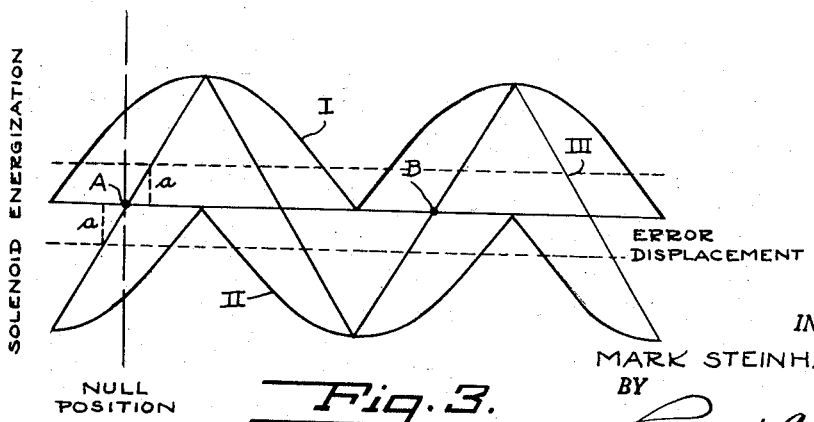
Fig.3.
INVENTOR.
MARK STEINHACKER
BY
Raymond A. Paquin
ATTORNEY.

July 21, 1959

M. A. STEINHACKER 2,896,142

SERVO CONTROLLER

Filed Dec. 12, 1956

2 Sheets-Sheet 2

INVENTOR.
MARK STEINHACKER
BY
Raymond A. Paquin
ATTORNEY.

United States Patent Office 2,896,142
Patented July 21, 1959

2,896,142

SERVO CONTROLLER

Mark A. Steinhacker, Rockville Centre, N.Y., assignor to American Bosch Arma Corporation, a corporation of New York Application December 12, 1956, Serial No. 627,900

7 Claims. (Cl. 318—30)

The present invention relates to motor control means and has particular reference to remote control positioning devices.

Control devices having differential magnetic circuits are commonly used to control various types of motive means according to the difference between two input signals. Such devices include hydraulic valves which control the flow of fluid to a hydraulic motor and directional relays which control the energization of an electric motor, for example. These devices are inherently capable of power amplification and the present invention contemplates a device of this type to control the operation of an appropriate servo motive means, which is adapted to drive a controlled shaft to a desired position. According to this invention, the controlled shaft is connected to a signal receiver which is energized by signals indicative of the desired position of the controlled shaft and which produces a pair of signals according to the shaft displacement. These signals, generally proportional to the sine and cosine of the displacement angle although not necessarily so, are rectified and applied to the input of the control device. The control device is operated to energize the motive means in a manner such that the controlled shaft is driven in the direction tending to equalize the signals energizing the control device. When these signals are equal the motor becomes deenergized and the controlled shaft is in the desired position.

One advantage of this circuit is that a servo system can be constructed without the use of electronic amplifiers and associated power supplies. A further advantage is that all the power for the signal channel is supplied by the signal generating and receiving system resulting in simplified wiring, but necessitating signal generating and receiving equipment capable of transmitting the required amount of power.

Figure 5:
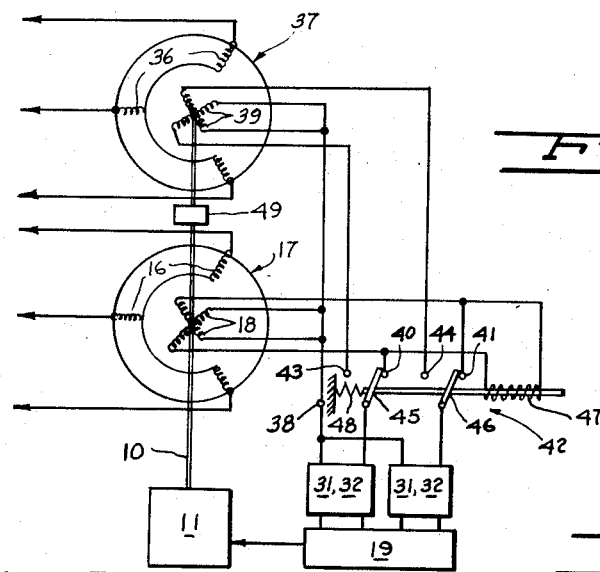
Figure 6:
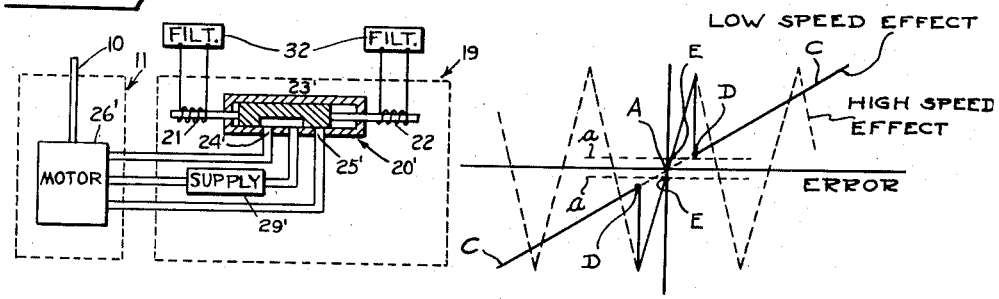
Figure 7:
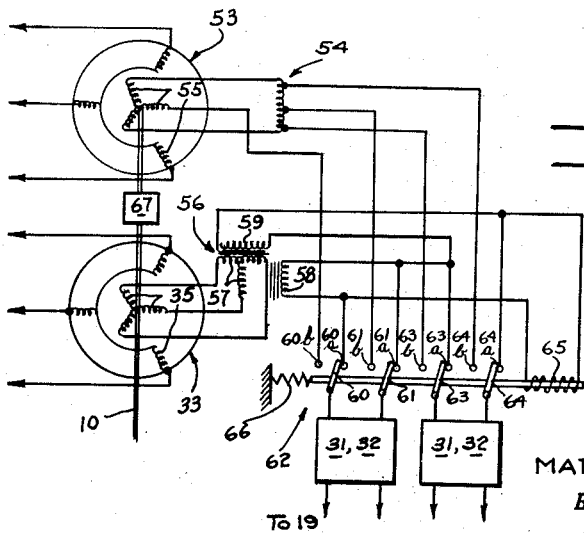

For a more complete understanding of this invention, reference may be had to the accompanying diagrams, in which:

Fig. 1 is a functional schematic view of the invention;
Fig. 2 is a wiring diagram of a particular embodiment of the invention;
Fig. 3 is an explanatory curve;
Fig. 4 shows a modification of a portion of Fig. 2;
Fig. 5 shows the embodiment of Fig. 2 applied to a two speed system;
Fig. 6 is an explanatory curve;
Fig. 7 shows the modification of Fig. 4 applied to a two speed system; and
Fig. 8 shows a modification of Fig. 2, in part.

Fig. 1 shows generally a remote control system to which the invention may be applied, and includes a controlled shaft 10 which is driven by a motion means 11 to a position dictated by the rotational position of order shaft 12. In general, the order shaft 12 is adapted to displace the rotor of a positional signal transmitter 14 and the electrical signals produced therein are connected to energize the signal receiver 17. Positional disagreement between the position of shaft 10 and the signals to receiver 17 produce electrical output signals which are adapted to regulate the energization of the motive means 11. The motive means 11 is regulated through a high power gain device 19 having a differential magnetic circuit for the control input. Such devices include hydraulic valves for control of hydraulic motors, directional relays for control of electric motors and magnetic particle clutches for power takeoff from a constantly driven shaft, for example.

The operation of systems of this sort is well known to those in the art. The particular transmitter 14, receiver 17 and power gain device 19 may be chosen from a number of available components, the invention not being limited to the choice of any particular devices except as will be pointed out in the following description.

Fig. 2, for example, shows a particular preferred embodiment in which the transmitter 14 is a synchro generator having an energized rotor winding 13 driven by shaft 12 and a three phase stator winding 15. The receiver 17 is a three phase to two phase resolver in which the three phase stator windings 16 are electrically connected to stator windings 15 and the two phase rotor windings 18 are driven by shaft 10.

The terminology "three phase" is intended to denote that voltages induced in stator windings 15 are separated by 120° with respect to the rotational displacement between the stator windings 15 and the rotor winding 13. The terminology "two phase" similarly denotes that the voltage induced in the several rotor windings 18 are 90° out of phase with respect to the rotational displacement between the stator and rotor windings 16 and 18. All the voltages, however, are considered to be in time phase, i.e., they reach a maximum and a minimum at the same instant of time.

The resolver 17 receives at its three-phase winding 16 the signals from synchro generator 14 and produces a magnetic field oriented with respect to the stator housing according to the displacement between the rotor winding 13 and stator windings 15. The magnetic flux induces in the two mutually perpendicular rotor windings 18 of the resolver 17 voltages which are proportional to the sine and cosine of the displacement angle between the orientation of the magnetic field and the orientation of the rotor shaft 10.

Fig. 2 also illustrates the control device 19 as a directional relay 20 in which the energization of the solenoid windings 21, 22 controls the position of the movable contact 23. The movable contact 23 is drawn into cooperation with either stationary contact 24 or 25 depending on which solenoid 21 or 22 exerts the greater force on the movable contact 23. Motive means 11 is preferably a two-phase motor 26 having a main field winding 27 constantly energized, and a control field winding 28 selectively energized through relay switch 20 from the power supply 29 and transformer 30. Thus when solenoid 21 is controlling, the motor 26 drives shaft 10 in one direction and when solenoid 22 is controlling, the motor 26 drives shaft 10 in the opposite direction.

As mentioned previously, the control device is not limited to the directional relay of Fig. 2, but may instead be the hydraulic counterpart, i.e., a hydraulic valve 20' such as shown in Fig. 8. In this embodiment, relay windings 21', 22' control the position of a slide 23' which according to its position connects the hydraulic supply 29' to either of the ports 24' or 25' to supply fluid through appropriate tubing to the hydraulic motor 26'. Depending upon which of the ports 24' or 25' is uncovered, motor 26' drives shaft 10 in the direction such as to equalize the voltages on the relay windings 21', 22' and return the slide 23' to the center, whence both ports 24' and 25' are covered and motor 26' stops.

Each of the two rotor windings 18 are connected to a particular solenoid winding 21 or 22 through the corresponding full wave rectifying devices 31 and the filter and stabilizing networks 32. The solenoid 21 is therefore energized by a direct current which varies with the displacement of rotor winding 18 from the magnetic field orientation, i.e., with the displacement of shaft 10 from its position of correspondence. This relationship is shown as curve I in Fig. 3. At the same time, the energization of solenoid 22 varies as shown in curve II of Fig. 3; curves I and II are plotted on opposite sides of the axis to show the directional effect of the energization on the relay 20. The total force on the movable contact 23 is therefore represented by the sum of curves I and II or by the substantially saw toothed curve III. Curve III is actually part of a sine wave, being the difference between sine and cosine values and is not linear between peaks as seeming in Fig. 3. If the pickup and drop out energization of the relay 20 is indicated by a level of energization at the horizontal dotted lines, motor 26 will be energized to drive shaft 10 whenever the energization of the relay windings 21, 22 differs by more than an amount $a$. The relative value of $a$ is greatly exaggerated in Fig. 3 in the interest of clarity.

It will be noted that the null or correspondence position of shaft 10 occurs when the energization of both windings 18 are equal, i.e., when the windings 18 are displaced by 45° from the orientation of the magnetic field of stator windings 16. This condition occurs four times in one revolution of the rotor windings 18 as seen in Fig. 3 but only the alternate points A and B are stable operating points, and only one of these, A, is the desired null. Assurance that shaft 10 is driven to position A rather than position B may be had by providing mechanical stops and gearing where necessary.

The three-phase to two-phase resolver 17 may be replaced by a synchro differential 33 and Scott connected transformer 34 as shown in Fig. 4. The stator windings 35 of the differential 33 are energized by the output of windings 15 of transmitter 14. The three-phase rotor windings 36 of the differential are operatively connected to shaft 10 and are electrically connected to a Scott-connected auto transformer 34 to change the three phase output to a two-phase output. The outputs of the transformer 34 are applied to the rectifiers 31, and the remainder of the circuit is the same as shown in Fig. 2.

Other variations include a full Scott-T connection of two transformers instead of the auto transformer 34 to allow input isolation, and the use of two phase resolvers as transmitter and receiver, for example. None of these will be described further since their operation will be clear to those in the art without additional explanation. At the present time resolvers, being used primarily for computing circuits, are both relatively expensive and not designed for transmitting the required power. Resolvers therefore would not find immediate use. Special devices may be designed for this purpose, however.

Figs. 5 and 7 show two possible arrangements for two-speed control, in which the low speed and high speed resolvers 17 and 37 respectively of Fig. 5 are fed by low and high speed signal generators (not shown) in the usual manner, now well known in the art.

One end of each of the rotor windings 18 of low speed resolvers 17 is electrically connected to a common lead 38 which is connected to one side of each of the rectifiers 31 and also to one end of each of the rotor windings 39 of the high speed resolver 37.

The other ends of rotor winding 18 are connected to the right hand stationary contacts 40, 41 of relay controlled switch 42, while the remaining ends of rotor windings 39 are connected to the left hand stationary contacts 43, 44 of the switch 42. The movable contacts 45, 46 of the switch 42 are severally connected to the remaining terminals of the two rectifiers 31. The rotor of resolver 17 is driven directly by shaft 10 while the rotor of resolver 37 is driven by shaft 10 through appropriate gearing 49.

The relay control winding 47 is energized by the output of the series connected rotor windings 18 in a manner such that the energization of the relay winding 47 may be represented by the expression $\sin\theta - \cos\theta$ where $\theta$ is the angular displacement between the magnetic flux vector of stator windings 16 and the rotor windings 18. Thus, wherever the displacement $\theta$ is substantially more than forty-five degrees the relay winding 47 is energized to draw the movable contacts 45, 46 to the right and to apply the low speed signals (C on Fig. 6) to rectifiers 31.

Rectifiers and filters 31, 32 are connected to a control device 19 similar to that shown in Fig. 2 and in a similar way. The output of that control device energizes a motive means such as that illustrated by rectangle 11 in Fig. 2 to drive the shaft 10 to the required position.

Fig. 6 shows the effects on device 19 of both the low speed receiver 17 and the high speed receiver 37 in a limited region about the correspondence point A, and may be compared with the curve III of Fig. 3. Thus, the low speed receiver 17 effect is the same as a portion of curve III between peaks while the high speed effect is a continuous repetition of curve III.

As the motive means 11 drives the shaft 10 toward the null position, and the angle $\theta$ becomes substantially equal to 45°, the relay winding 47 is deenergized (D on Fig. 6). The movable contacts 45, 46 are then urged to the left by spring means 48 to apply the high speed signals to the rectifiers 31, and motive means 11 continues to drive shaft 10 toward the null position until relay windings 21, 22 (Fig. 2) are equally energized (E on Fig. 6 or $a$ on Fig. 3) so that switch 23 is opened to deenergize motor 26 and the position of shaft 10 corresponds to the position of shaft 12, very nearly.

Fig. 7 shows a possible two speed system for synchro differential receivers. The rotor windings 55 of high speed receiver 53 are connected to the Scott-T auto transformer 54 such as shown in Fig. 4 while the rotor windings 35 of low speed receiver 33 are connected to a full Scott-T transformer 56 having T-connected primary windings 57 and two secondary windings 58, 59. One secondary winding 58 is connected to the right hand terminals 60a, 61a of relay controlled switch 62 and the other secondary winding 59 is connected to the right hand terminals 60b, 61b are connected to one output of transformer 54 while the other output of that transformer is connected to terminals 63b, 64b. The movable contacts 60, 61 are connected to the input of one rectifier-filter 31, 32 while the movable contacts 63, 64 are connected to the input of the other rectifier-filter 31, 32. Shaft 10 drives the rotor of low speed receiver 33 directly and the rotor of high speed receiver 53 through appropriate gearing 67.

The relay winding 65 for operating switch 62 is energized by the difference between the voltages induced in windings 58, 59 by serially connecting all of said windings as shown in Fig. 7.

Whenever the difference between the outputs of windings 58 and 59 is greater than a certain predetermined value, D of Fig. 6, for example, the relay winding 65 is energized to draw the movable contacts of switch 62 to the right and to apply the outputs of windings 58, 59 to the controller 19. When this difference is reduced to the point where spring 66 overcomes the force of relay winding 65 the movable contacts of switch 62 are drawn to the left to apply the output of Scott transformer 54 to the controller 19.

I claim:
1. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means producing a pair of electrical signals varying with the displacement of said controlled shaft, control means for said motive means and having a pair of input circuits, electrical connections between said signal receiving means and said input circuits and rectifying means interposed in said last named connections.

2. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means producing a pair of electrical signals varying with the displacement of said controlled shaft, control means comprising a directional relay for said motive means, said motive means comprising an electric motor, electrical connections between said receiving means and said control means and rectifying means interposed in said last named connections.

3. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means having a set of primary windings electrically connected to said signal generating means and a set of secondary windings rotatable relative to said primary windings and operatively connected to said controlled shaft, control means for said motive means having a pair of input circuits, electrical connections between said secondary windings and said input circuits and rectifying means interposed in said last named connections.

4. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means having a set of primary windings electrically connected to said signal generating means and a pair of secondary windings rotatable relative to said primary windings and operatively connected to said controlled shaft, control means for said motive means having a pair of input circuits, electrical connections between said secondary windings and said input circuits and rectifying means interposed in said last named connections.

5. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means having a set of primary windings electrically connected to said signal generating means and three-phase secondary windings rotatable relative to said primary windings and operatively connected to said controlled shaft, transformer means connected to said secondary windings to provide a two-phase signal, control means for said motive means having a pair of input circuits, electrical connections between said transformer and said input circuits and rectifying means interposed in said last named connections.

6. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means producing a pair of electrical signals varying with the displacement of said controlled shaft, control means for said motive means including a differential magnetic input circuit and having a pair of input circuits, electrical connections between said signal receiving means and said input circuits and rectifying means interposed in said last named connections.

7. In a device of the character described, a controlled shaft, motive means operatively connected to said controlled shaft, an order shaft, signal generating means operatively connected to said order shaft, signal receiving means electrically connected to said signal generating means and operatively connected to said controlled shaft, said signal receiving means producing a pair of electrical signals varying with the displacement of said controlled shaft, control means for said motive means, comprising an electrically operated hydraulic valve, said motive means comprising a hydraulic motor, and having a pair of input circuits, electrical connections between said signal receiving means and said input circuits and rectifying means interposed in said last named connections.

References Cited in the file of this patent

UNITED STATES PATENTS

| | | |
|---|---|---|
| 1,800,303 | Lindsay | Apr. 14, 1931 |
| 2,115,086 | Riggs | Apr. 26, 1938 |
| 2,432,422 | Hornfeck | Dec. 9, 1947 |
| 2,527,598 | Taylor | Oct. 31, 1950 |
| 2,572,044 | McCarthy et al. | Oct. 23, 1951 |
| 2,654,999 | Berge | Oct. 13, 1953 |
| 2,661,452 | Curry et al. | Dec. 1, 1953 |